(12) United States Patent
Babbini et al.

(10) Patent No.: US 9,765,770 B2
(45) Date of Patent: Sep. 19, 2017

(54) AUTOMATIC VALVE WITH A SPRING HOLDER RING

(71) Applicant: Nuovo Pignone Srl, Florence (IT)

(72) Inventors: Alberto Babbini, Terni (IT); Riccardo Bagagli, Florence (IT); Guido Pratelli, Pisa (IT)

(73) Assignee: Nuovo Pignone SRL, Florence (IT)

( * ) Notice: Subject to any disclaimer, the term of this patent is extended or adjusted under 35 U.S.C. 154(b) by 310 days.

(21) Appl. No.: 14/383,218

(22) PCT Filed: Mar. 6, 2013

(86) PCT No.: PCT/EP2013/054535
§ 371 (c)(1),
(2) Date: Sep. 5, 2014

(87) PCT Pub. No.: WO2013/131976
PCT Pub. Date: Sep. 12, 2013

(65) Prior Publication Data
US 2015/0044081 A1 Feb. 12, 2015

(30) Foreign Application Priority Data
Mar. 8, 2012 (IT) .............................. FI2012A0048

(51) Int. Cl.
*F04B 39/10* (2006.01)
*F04B 49/22* (2006.01)
(Continued)

(52) U.S. Cl.
CPC .......... *F04B 49/225* (2013.01); *F04B 39/102* (2013.01); *F04B 39/1053* (2013.01);
(Continued)

(58) Field of Classification Search
CPC .............. F04B 39/1033; F04B 39/1053; F04B 39/1066; F16K 15/08; F16K 15/12
See application file for complete search history.

(56) References Cited

U.S. PATENT DOCUMENTS

| 1,433,094 A | 10/1922 | Parsons |
| 3,536,094 A | 10/1970 | Manley |

(Continued)

FOREIGN PATENT DOCUMENTS

| CN | 101225812 A | 7/2008 |
| DE | 747987 C | 10/1944 |

(Continued)

OTHER PUBLICATIONS

International Search Report and Written Opinion dated Apr. 26, 2013 which was issued in connection with PCT Patent Application No. PCT/EP13/054535 which was filed on Mar. 6, 2013.

(Continued)

*Primary Examiner* — Patrick Hamo
(74) *Attorney, Agent, or Firm* — GE Global Patent Operation (57) ABSTRACT

An automatic valve including a valve seat having first gas flow passages extending there through and a valve guard having second gas flow passages extending there through. The valve further comprises at least one shutter member movably arranged between the valve guard and the valve seat, at least one set of spring members biasing the at least one shutter member towards a closed position in sealing engagement with the valve seat to close the first gas flow passages, and at least one spring holder ring provided with a plurality of spring retention seats. Each spring member of the set of spring members is partially housed in a respective spring pocket formed in the valve guard and retained in a respective one of the spring retention seat.

18 Claims, 10 Drawing Sheets (51) Int. Cl.
  *F16K 15/08* (2006.01)
  *F16K 15/12* (2006.01)
(52) U.S. Cl.
  CPC ............. *F16K 15/08* (2013.01); *F16K 15/12* (2013.01); *Y10T 137/7062* (2015.04)

(56) References Cited

U.S. PATENT DOCUMENTS

| | | | |
|---|---|---|---|
| 4,854,341 A | 8/1989 | Bauer | |
| 4,924,906 A | 5/1990 | Hrabal | |
| 5,678,603 A | 10/1997 | Tschoep | |
| 6,149,400 A * | 11/2000 | Samland | F04B 39/08 137/516.13 |
| 7,533,692 B2 * | 5/2009 | Walpole | F04B 39/1026 137/529 |
| 7,886,764 B2 | 2/2011 | Spiegl et al. | |
| 2008/0230733 A1 | 9/2008 | Spiegl et al. | |
| 2009/0220725 A1 * | 9/2009 | Stefan | F16K 15/08 428/66.6 |

FOREIGN PATENT DOCUMENTS

| | | |
|---|---|---|
| DE | 2446977 A1 | 4/1976 |
| EP | 0300989 B1 | 1/1989 |
| EP | 0692630 A1 | 1/1996 |
| EP | 2249036 A1 | 11/2010 |
| GB | 1055684 | 6/1964 |
| JP | 54121346 U | 8/1979 |
| JP | 57180178 U | 11/1982 |
| JP | 63227974 A | 9/1988 |
| JP | 0249979 A | 2/1990 |
| SU | 1065630 A1 | 1/1984 |
| WO | 2006067011 | 6/2006 |

OTHER PUBLICATIONS

Italian Search Report and Written Opinion dated Nov. 2, 2012 which was issued in connection with Italian Patent Application No. FI2012A000048 which was filed on Mar. 8, 2012.
Unofficial English Translation of Chinese Office Action issued in connection with corresponding CN Application No. 201380012867.2 on Nov. 24, 2015.
Unofficial English Translation of Japanese Office Action issued in connection with corresponding JP Application No. 2014560362 on Dec. 27, 2016.
Unofficial English Translation of Russian Notice of Allowance issued in connection with corresponding RU Application No. 2014134636 on Jan. 25, 2017.
Unofficial English Translation of Japanese Search Report issued in connection with corresponding JP Application No. 2014560362 on Feb. 7, 2017.

* cited by examiner

AUTOMATIC VALVE WITH A SPRING HOLDER RING

FIELD OF THE INVENTION

Embodiments of the present disclosure relate to automatic valves, such as ring valves. More particularly, some embodiments relate to automatic ring valves for reciprocating compressors. According to a further aspect, the disclosure relates to reciprocating compressors.

DESCRIPTION OF THE RELATED ART

Automatic valves are commonly used, for example, in reciprocating compressors. Automatic valves are arranged on both the suction side as well as the discharge side of the compressor, to automatically open and close the suction port and discharge port of the compressor under the control of the pressure inside the compressor cylinder.

Figure 1:
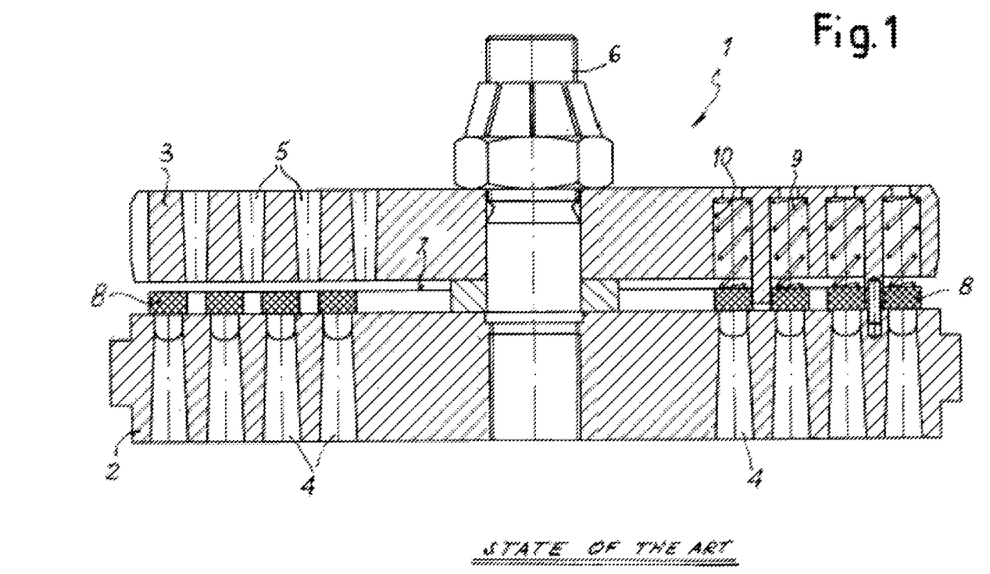
FIG. 1 illustrates a longitudinal section according to a longitudinal plane of an automatic ring valve of the prior art.

An exemplary embodiment of an automatic ring valve of the prior art is illustrated in FIG. 1. The automatic ring valve 1 comprises a valve seat 2 and a valve guard 3. The valve seat is provided with circumferentially arranged gas flow passages 4 extending through the valve seat 2. The valve guard 3 is in turn provided with gas flow passages 5. A central screw 6 connects the valve seat 2 and the valve guard 3 to one another leaving a space 7 there between. A plurality of concentrically arranged shutter rings 8 are provided between the valve seat 2 and the valve guard 3. Each shutter ring 8 is arranged along a set of corresponding annularly arranged gas flow passages 4 of the valve seat 2. A plurality of compression springs 9 is provided for each shutter ring 8 for biasing the shutter ring 8 in a closed position, wherein the shutter ring 8 closes the respective set of gas flow passages 4 by sealingly contacting corresponding sealing surfaces 4A of the gas flow passages 4. The compression springs 9 are housed in respective spring pockets 10 provided in the valve guard 3.

Figure 2:
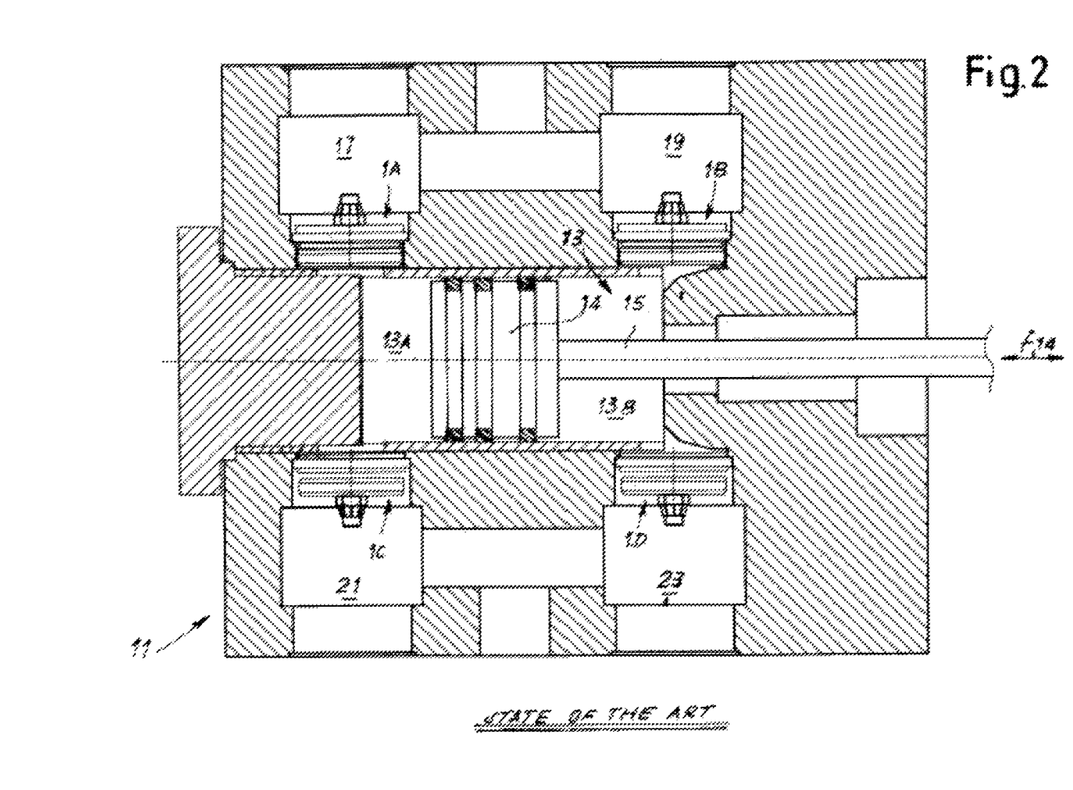
FIG. 2 illustrates a longitudinal section of the head of a reciprocating compressor using automatic ring valves of the prior art.

Differential pressure across the valve 1 causes automatic opening and closing of the valve. FIG. 2 illustrates the head 11 of a reciprocating compressor using four automatic ring valves 1 arranged on the suction ports and discharge ports of the compressor and designated 1A, 1B, 1C, and 1D.

More in detail, the compressor head 11 defines a compressor cylinder 13 wherein a piston 14 is reciprocatingly movable. A rod 15 of the piston 14 is connected to a crank (not shown), which reciprocatingly moves the piston 14 according to double arrow f14. The piston 14 divides the cylinder 13 into two separate compression chambers 13A, 13B.

The compressor head 11 is provided with a first suction port 17 in fluid communication with the first compression chamber 13A through a first automatic ring valve 1A. A second suction port 19 is in fluid communication with the second compression chamber 13B through a second automatic ring valve 1B. A first discharge port 21 is in fluid communication with the first compression chamber 13A through a third automatic ring valve 1C and a second discharge port 23 is in fluid communication with the second compression chamber 13B through a fourth automatic ring valve 1D.

The reciprocating motion of the piston 14 causes selectively suction of the gas in the first compression chamber 13A and discharge of compressed gas from the second compression chamber 13B and vice versa. The automatic ring valves 1A, 1B, 1C and 1D selectively open when the pressure in the first gas flow passages 4 exceeds the resilient force of the springs 9.

The crank shaft of reciprocating compressors can rotate at a rotary speed in the range of for example 100-1200 rpm and typically between 200 and 1000 rpm. The shutter rings 8 are therefore, subject to repeated opening and closing strokes at high speed. They are commonly made of composite material, such as fiber-reinforced synthetic resin to reduce the mass thereof and thus the inertia. The valve seat 2 and the valve guard 3 are typically made of metal.

SUMMARY OF THE INVENTION

An automatic valve, such as an automatic valve for reciprocating compressors is disclosed, wherein compression spring members acting upon the shutter member of the valve are connected by a spring holder ring, interposed between the spring members and the shutter member, to provide guidance of the spring members and a more uniform biasing action on the shutter member.

According to some embodiments, an automatic valve is provided, comprising in combination: a valve seat having first gas flow passages extending there through; a valve guard having second gas flow passages extending there through; at least one shutter member movably arranged between said valve guard and said valve seat; at least one set of spring members, biasing said at least one shutter member towards a closed position in sealing engagement with said valve seat for closing said first gas flow passages; at least one spring holder ring provided with a plurality of spring retention seats. The spring holder ring is arranged between the valve guard and the shutter member. Each spring member of said set of spring members is partially housed in a respective spring pocket formed in said valve guard and retained in a respective one of said spring retention seats.

In some embodiments, the shutter member is comprised of a plurality of ring shutters. A respective spring holder ring is combined with each shutter ring and retains the spring members acting on the same ring shutter.

In some embodiments, the spring holder ring comprises a surface facing the valve seat, contacting said at least one shutter member.

In some embodiments, only one set of spring members is provided for each shutter member or for each shutter ring. In other embodiments, secondary spring members can further be provided, which are arranged between the spring holder ring and the respective shutter member. In such arrangements, the shutter member or shutter ring is biased by two sets of spring members arranged in series.

In one embodiment, the spring holder ring is slidingly engaged in a respective annular slot provided in the valve guard.

The valve can be comprised of a plurality of spring holder rings and a plurality of sets of spring members, the spring members of each set of spring members being partially arranged in spring retention seats of a corresponding one of said plurality of spring holder rings. Each spring holder ring may co-act with a corresponding shutter ring.

The shutter member may consist of a shutter plate or a plurality of shutter plates. In some embodiments, the shutter member comprises a plurality of concentrically arranged shutter rings. The shutter rings can be connected to one another, e.g. with flexible connection members, or can be mechanically independent from one another.

The spring members may be compression helical springs. Each spring member has a first end and a second end, the first end being housed in a corresponding one of said spring pockets and the second end being retained in a corresponding one of said spring retention seats of the respective spring holder ring.

In some embodiments, each spring holder ring comprises a plurality of secondary spring retention seats. A secondary spring member may be arranged in each said secondary spring retention seats and resiliently contacts said at least one shutter member.

The spring holder rings may be made of a shock damping material. For example, said spring holder rings can be made of a composite material. In some embodiments, the spring holder rings are made of a reinforced thermoplastic material. The thermoplastic material may be reinforced with fibers selected from the group consisting of: glass fibers, carbon fibers, aramidic fibers, or combinations thereof.

According to a further aspect, the disclosure refers to an automatic valve comprising: a valve seat having first gas flow passages extending there through; a valve guard having second gas flow passages extending there through; a plurality of shutter rings arranged between said valve guard and said valve seat; for each shutter ring, a set of spring members, biasing the respective shutter ring towards a closed position in sealing engagement with said valve seat to close said first gas flow passages; for each shutter ring, a corresponding spring holder ring provided with a plurality of spring retention seats, each spring member of the respective set of spring members being partially arranged in a respective spring pocket formed in said valve guard and retained in a respective retention seat of said spring holder ring.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The embodiments described in greater detail below and illustrated in the drawings specifically refer to automatic ring valves, i.e. automatic valves comprising a plurality of concentrically arranged shutter rings. In other embodiments, not shown, a shutter plate made of one or more components constrained to one another to form a single shutter member can be provided instead of concentrically arranged shutter rings.

FIGS. 3 to 7 illustrate an exemplary embodiment of an automatic ring valve according to the subject matter disclosed herein. The automatic ring valve is globally designated 50. The valve 50 comprises a valve seat 52 and a valve guard 54. The valve seat 52 and the valve guard 54 are connected to one another by means of a screw arrangement 56. A space is left between the valve seat 52 and the valve guard 54, wherein movable shutter rings arranged, as will be described in greater detail below.

The valve seat 52 is provided with a set of first gas flow passages 58. In some embodiments, the gas flow passages 58 have the shape of elongated curved holes or apertures. In some embodiments, the gas flow passages 58 are arranged along concentrically disposed circumferences. In other embodiments, the gas flow passages 58 can have a circular cross section, rather than being elongated. Each set of circumferentially arranged gas flow passages 58 is sealingly closed by a respective one of said movable shutter rings.

In the embodiment illustrated in the drawings, a set of shutter rings 60 are arranged between the valve seat 52 and the valve guard 54. In some embodiments, the shutter rings 60 are independent of each other, i.e. they are not constrained to one another. In other embodiments, the shutter rings 60 can be constrained to one another by constrain members so as to form a single unit with through apertures therein, allowing the gas to flow there through. In some embodiments, the shutter rings 60 can be connected to one another forming a single movable shutter member in the form of a valve plate. The valve plate will thus be provided with ring projections on one face of said valve plate, which will in turn be apertured, such as to provide a gas passage through the valve plate.

In the drawings each set of gas flow passages 58 arranged along the same circumference are closed by a respective one of said concentrically arranged shutter rings 60 by means of mutually co-acting sealing surfaces.

The valve guard 54 is provided with a set of second gas flow passages 61. Similarly to the first gas flow passages 58, also the second gas flow passages 61 can be arranged along concentrically extending circumferences and can be in the form of elongated curved apertures or holes. In other embodiments, the second gas flow passages 61 can have a circular cross section rather than an elongated cross section. The first gas flow passages 58 and the second gas flow passages 61 are radially off-set so that when the shutter rings 60 are in the open position, gas can flow through the valve 50.

Figure 3:
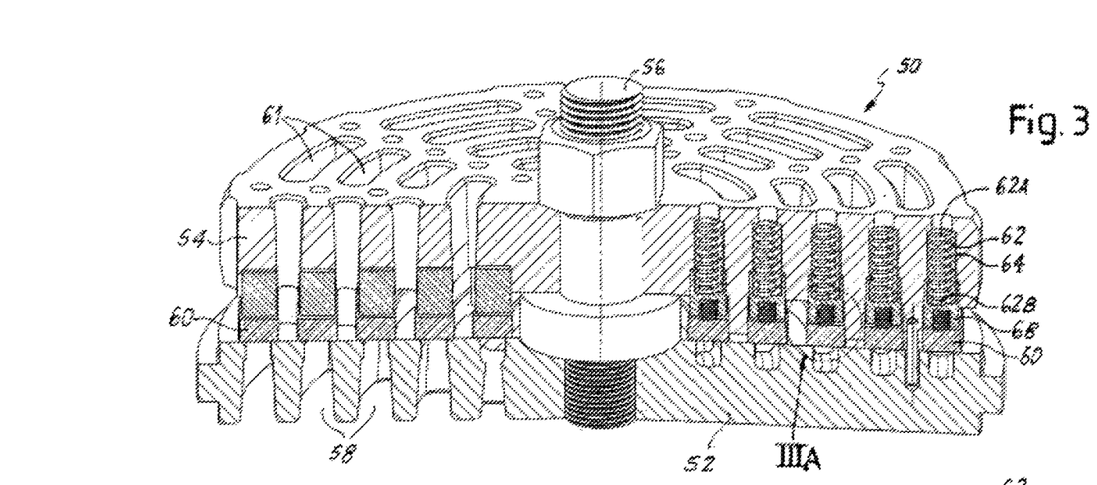
FIG. 3 illustrates a perspective sectional view of a ring valve according to an embodiment of the subject matter disclosed herein.
Figure 3A:
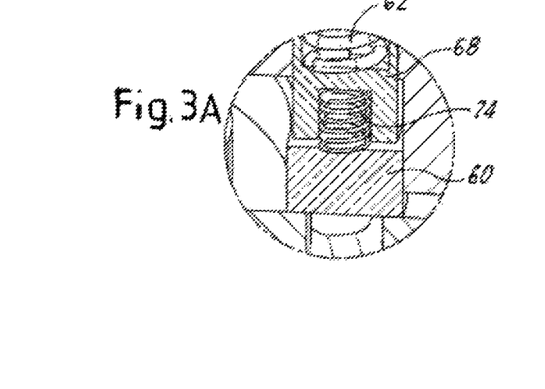
FIG. 3A illustrates an enlargement of detail IIIA in FIG. 3.
Figure 4:
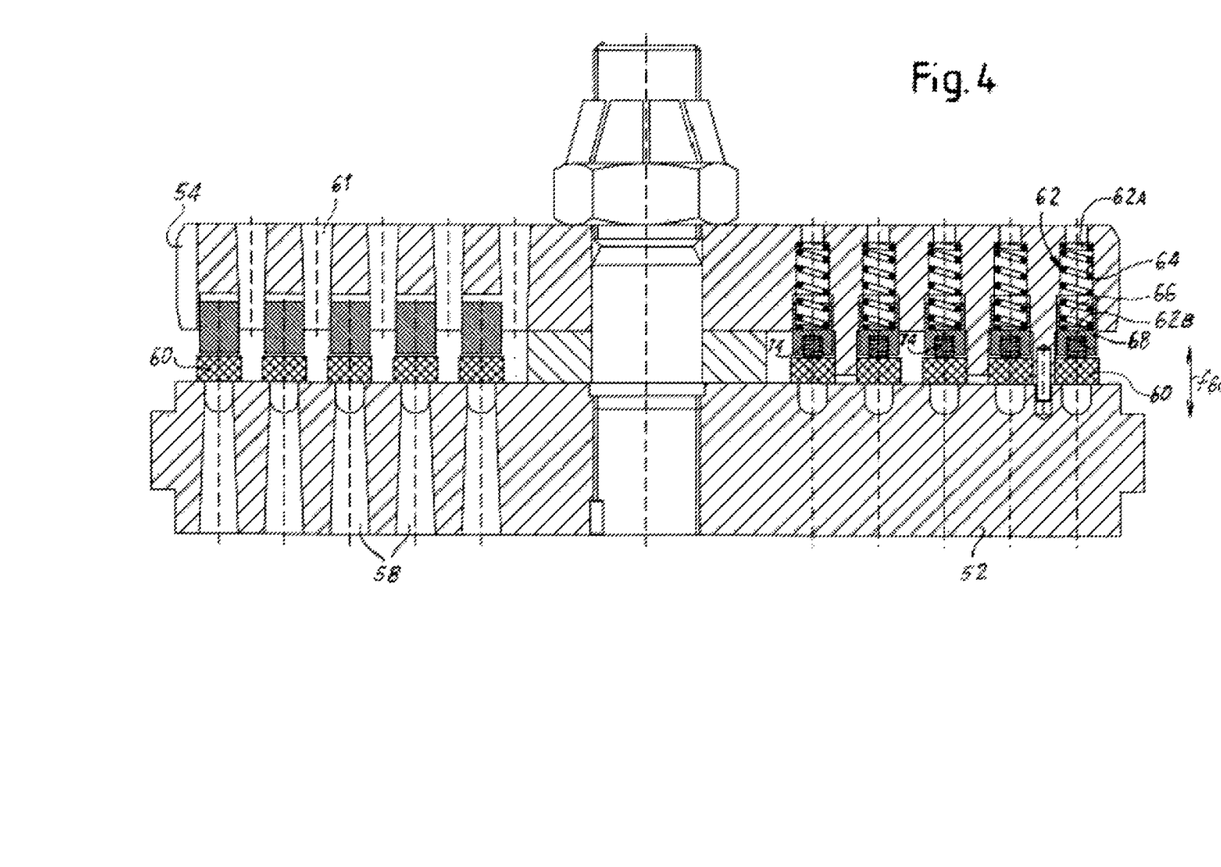
FIG. 4 illustrates a cross section according to an axial plane of the ring valve of FIG. 3.
Figure 5:
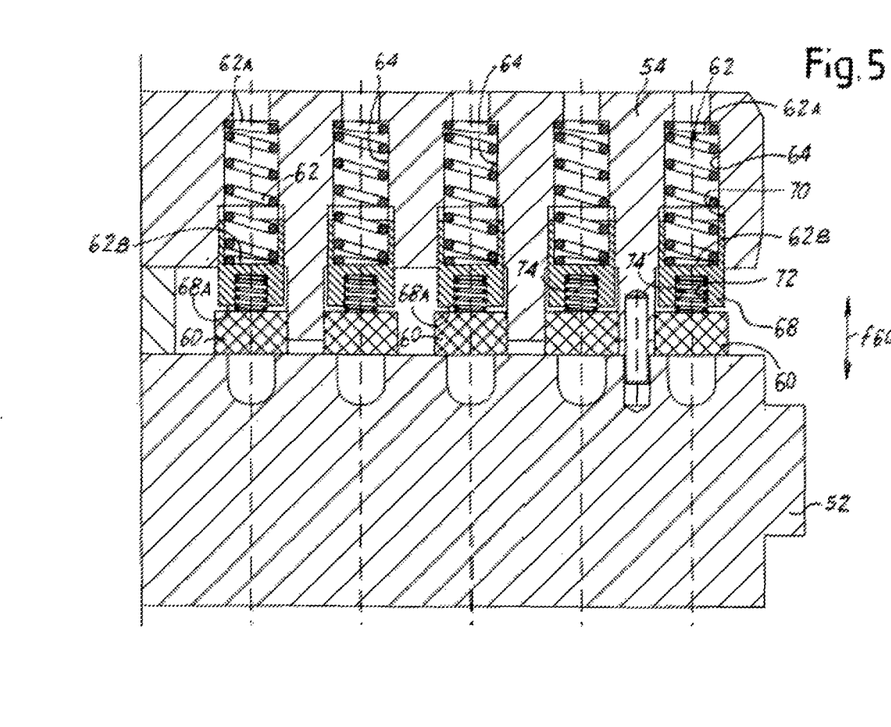
FIG. 5 illustrates an enlargement of FIG. 4.
Figure 6:
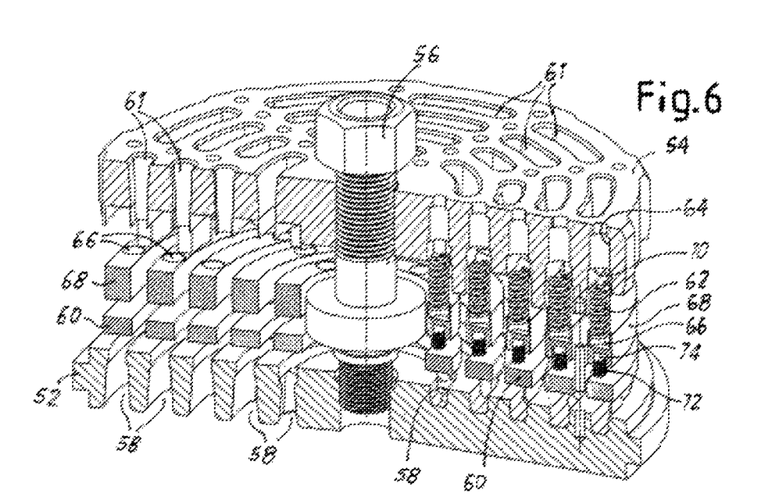
FIG. 6 illustrates an exploded view of the ring valve of FIGS. 3 to 5.
Figure 7:
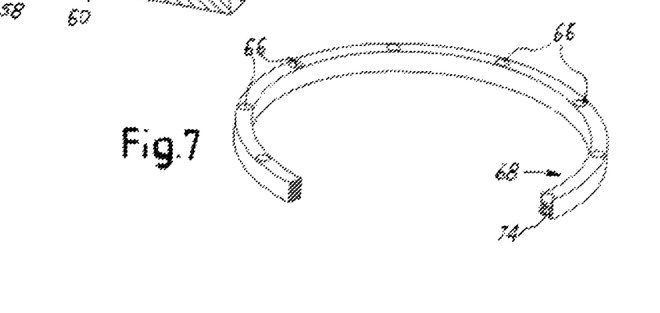
FIG. 7 illustrates a perspective and sectional view of the spring holder ring of the valve of FIGS. 3 to 6.

In some exemplary embodiments, each shutter ring 60 is resiliently biased towards the valve seat 52 by a set of spring members. The spring members can comprise helical compression springs 62. Each compression spring 62 can be partly housed in a respective spring pocket 64 provided in the valve guard 54.

Each compression spring 62 has a first end 62A and a second end 62B. The first end 62A is entirely housed in the corresponding spring pocket 64, while the second end 62B is housed in a respective retention seat 66 formed in a spring holder ring 68. In the embodiment illustrated in FIGS. 3 to 6, the ring valve 50 is comprised of five shutter rings 60, each of which is resiliently biased by a corresponding set of compression springs 62, which are each housed in a respective spring pocket 64. Each shutter ring 60 is combined with a respective spring holder ring 68, which retains the compression springs 62 by housing the ends 62B thereof in the corresponding spring retention seat 66.

Each spring holder ring 68 is slidingly housed in a respective annular slot 70, machined in the valve guard 54. The spring pockets 64 housing the springs 62 acting on the same shutter ring 60 open in the corresponding annular slot 70, in which the spring holder ring 68 is slidingly arranged.

In the embodiment illustrated in FIGS. 3 to 6, each spring holder ring 68 is further provided with secondary spring retention seats 72, which are formed on the planar surface of the spring holder rings 68 opposite to the surface where the spring retention seats 70 are arranged. Each secondary spring retention seat 72 of each spring holder ring 68 houses a respective secondary spring member 74. In the embodiment illustrated in the FIGS. 1 to 6, the secondary spring members 74 are formed by compression springs and more specifically helical compression springs similar to the compression springs 62, but smaller in dimension.

The secondary spring members 74, arranged in the secondary spring retention seats 72 of one spring holder ring 68, all act upon a respective shutter ring 60. Each shutter ring 60 is, therefore, biased towards the closed position (see for example FIGS. 4 and 5) by the combined action of the set of helical compression springs 62 and by the set of helical compression springs 74. When the force applied on each shutter ring 60 by the pressure difference between the first gas flow passages 58 and the second gas flow passages 61 exceeds the force generated by the compression springs 62, 74, the shutter ring 60 opens allowing the gas to flow across the valve. In some embodiments, the compression springs 74 are less rigid than the compression springs 62 and consequently the shutter rings 60 will start opening when the pressure difference is sufficient to overcome the biasing force of the compression springs 74.

During the opening and closing movement of the shutter rings 60, the compression springs 62 are guided and held by the spring holder ring 60 and by the spring pockets 64. The secondary springs 74 are guided in the secondary spring retention seats 72. Guidance of the springs 62 and 74 increases the smoothness of operation of the valve and prevents flexural stresses from being applied on the shutter rings 60 by the individual springs 62. Since all springs 62 which act on the same shutter ring 60 are guided by one and the same spring holder ring 68, a more uniform biasing effect on the shutter rings is achieved.

The use of two sets of compression springs 62 and 74 results in a smoother opening and closing of the shutter rings 60. When the pressure in the first gas flow passage 58 increases beyond the value which causes the valve to automatically open, the smaller secondary springs 74 will be compressed first and the shutter ring 60 will get in contact with the front surface 68A of the corresponding spring holder ring 68 facing the valve seat 52. Further increase of the pressure in the first gas flow passages 58 will cause compression of the compression springs 62 and therefore, the sliding movement of the spring holder ring 68 along the annular slot 70 until the valve is completely open, which will be achieved when the spring holder ring 68 has completed the inward stroke in the respective annular slot 70.

In some embodiments, the spring holder rings 68 are made of a damping material, such as a plastic material. A suitable material can be a thermoplastic resin and more particularly, a reinforced thermoplastic resin. Suitable reinforced thermoplastic resins can embed reinforcing fibers such as aramid fibers (Kevlar®), carbon fibers, glass fibers and the like. Using a damping material reduces the mechanical dynamic stresses on the valve caused by the opening movement of the shutter rings 60, since the kinetic energy is at least partly absorbed or dissipated by damping material of the spring holder rings 68.

The use of a double arrangement of compression spring 62, 74 also improves the behaviour of the valve during the closing movement of the shutter rings 60. The use of a damping material for the manufacturing of the spring holder rings 68 also reduces the impact stresses on the valve during the closure movement of the shutter rings 60.

Figure 8:
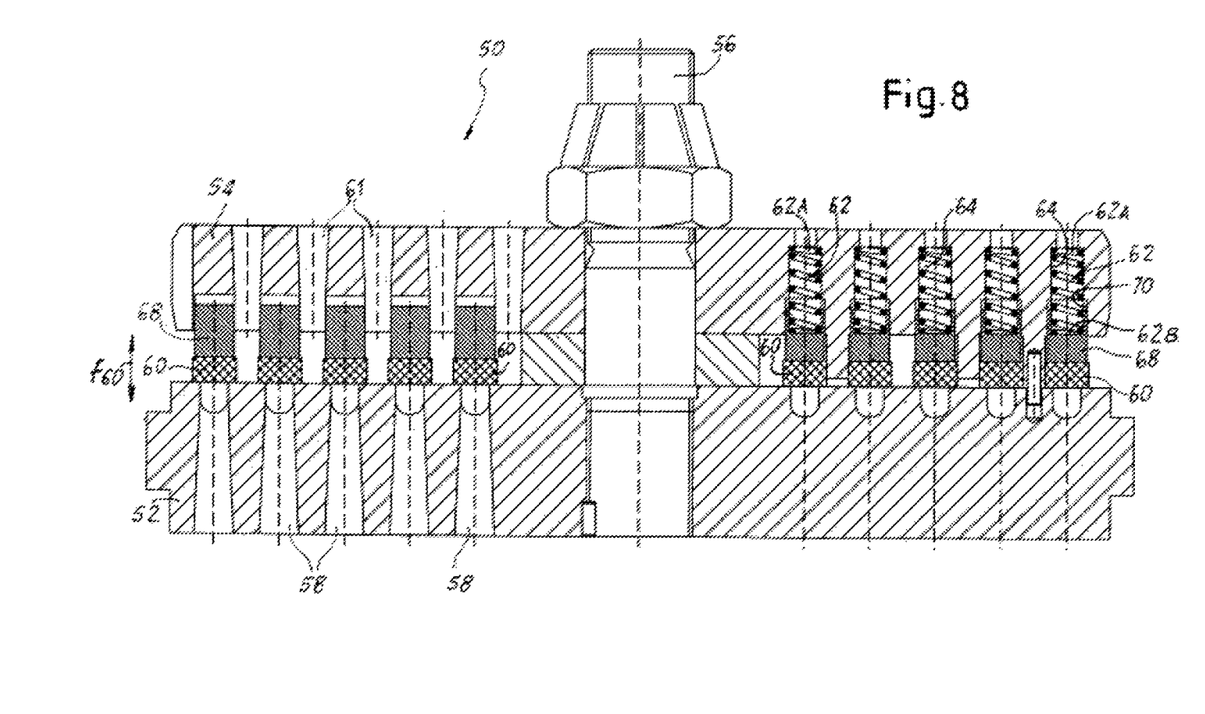
FIG. 8 illustrates a cross-sectional view of a further embodiment of a ring valve.
Figures 9, 10:
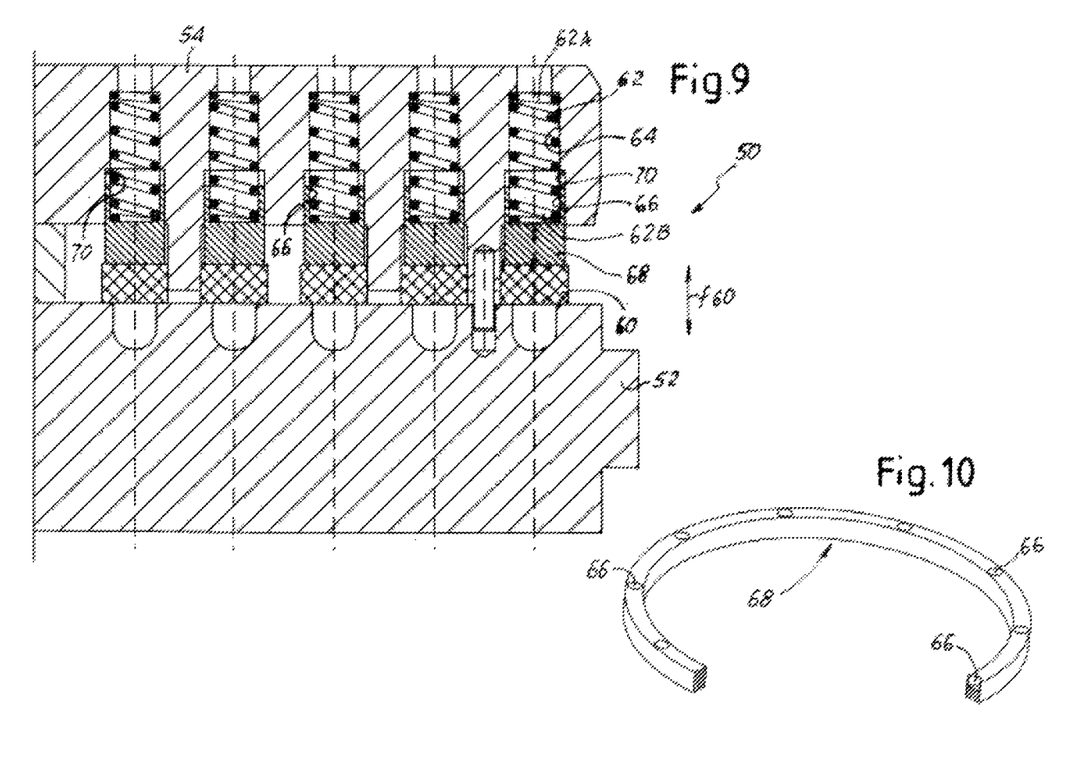
FIG. 9 illustrates an enlargement of FIG. 8.
FIG. 10 illustrates a perspective and sectional view of the spring holder ring of the valve of FIGS. 8 and 9.

FIGS. 8, 9 and 10 illustrate a further embodiment of a ring valve according to the present disclosure. The same reference numbers are used to designate the same or equivalent parts as shown in FIGS. 1 to 7.

The ring valve is designated 60 as a whole and comprises a valve seat 52 and a valve guard 54 connected to one another by means of a screw arrangement 56. First gas flow passages 58 are provided in the valve seat 52 and second gas flow passages 61 are provided in the valve guard 54. In the space between the valve seat 52 and the valve guard 54, shutter rings 60 are arranged, which are movable according to double arrow f60 to selectively open and close the gas flow passages 58.

The shutter rings 60 are maintained in the closed position shown in FIGS. 8 to 10 by respective spring members, which in this embodiment are in the form of helical compression springs 62. Each shutter ring 60 is biased by a corresponding set of compression springs 62, which are uniformly distributed along the annular extension of the corresponding shutter ring 60. Each compression spring 62 is at least partly housed in a corresponding spring pocket 64 formed in the valve guard 54. The first end 62A of each compression spring 62 abuts against the bottom of the spring pocket 64. The opposite end 62B of each compression spring 62 is housed in a corresponding spring retention seat 66 formed in a spring holder ring 68. One spring holder ring 68 is provided for each shutter ring 60, so that all the compression springs 62, acting on the same shutter ring 60, are retained and held by the same spring holder ring 68. The spring holder ring 68 is slidingly housed in an annular slot 70 formed in the valve guard 54. The spring pockets 64 housing the compression springs 62, which act on the same shutter ring 60, open in the annular slot 70, wherein the corresponding spring holder ring 60 is slidingly guided.

In this embodiment, each shutter ring 60 contacts directly the surface of the corresponding spring holder ring 68, without the interposition of any secondary spring.

Also in this embodiment, the spring holder ring 68 may be made of a damping material, such as resin, a reinforced resin, for example a fiber reinforced resin, and specifically, a fiber reinforced thermoplastic resin.

The operation of the valve 50 in this embodiment is substantially the same as disclosed above with respect to FIGS. 3 to 7. However, in this case opening and closing of the valve is controlled only by one set of springs 62 for each shutter ring 60, rather than by an arrangement of two spring sets in series, as disclosed above in connection with FIGS. 3 to 7.

As can be seen in FIGS. 8 and 10, the outer dimension of the spring holder ring 68 is constant along the entire annular development of the spring holder ring 68.

Figure 11:
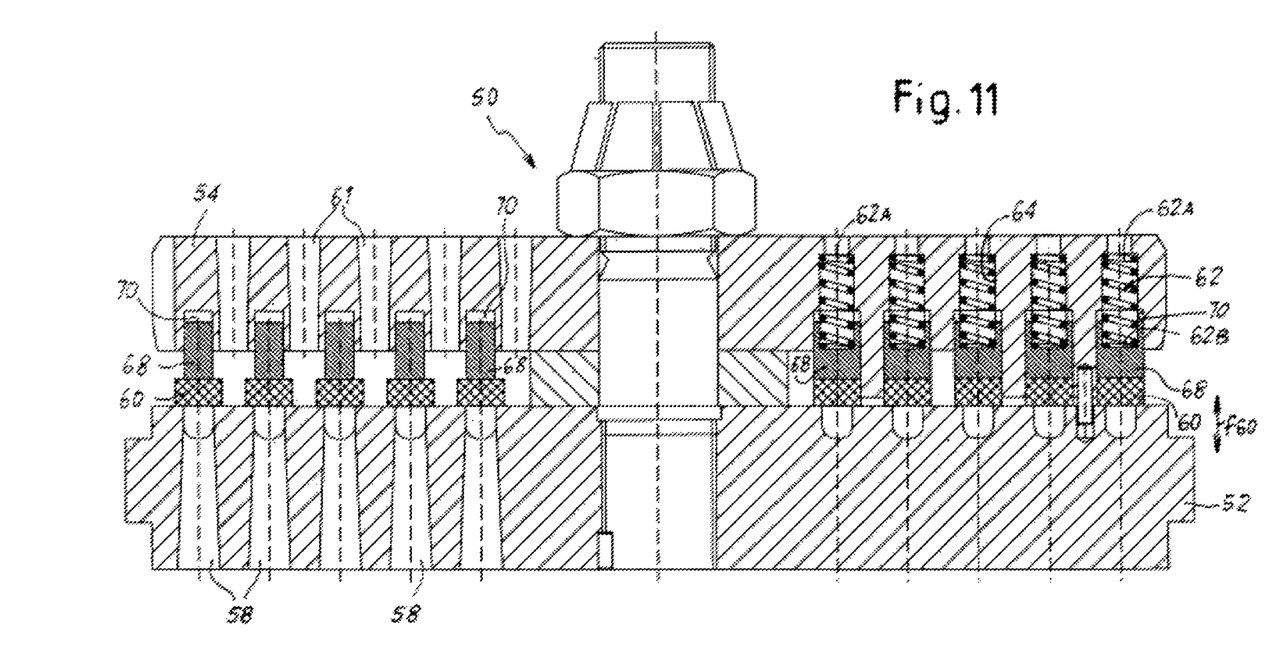
FIG. 11 illustrates a cross-section of a further embodiment of a ring valve.
Figures 12, 13:
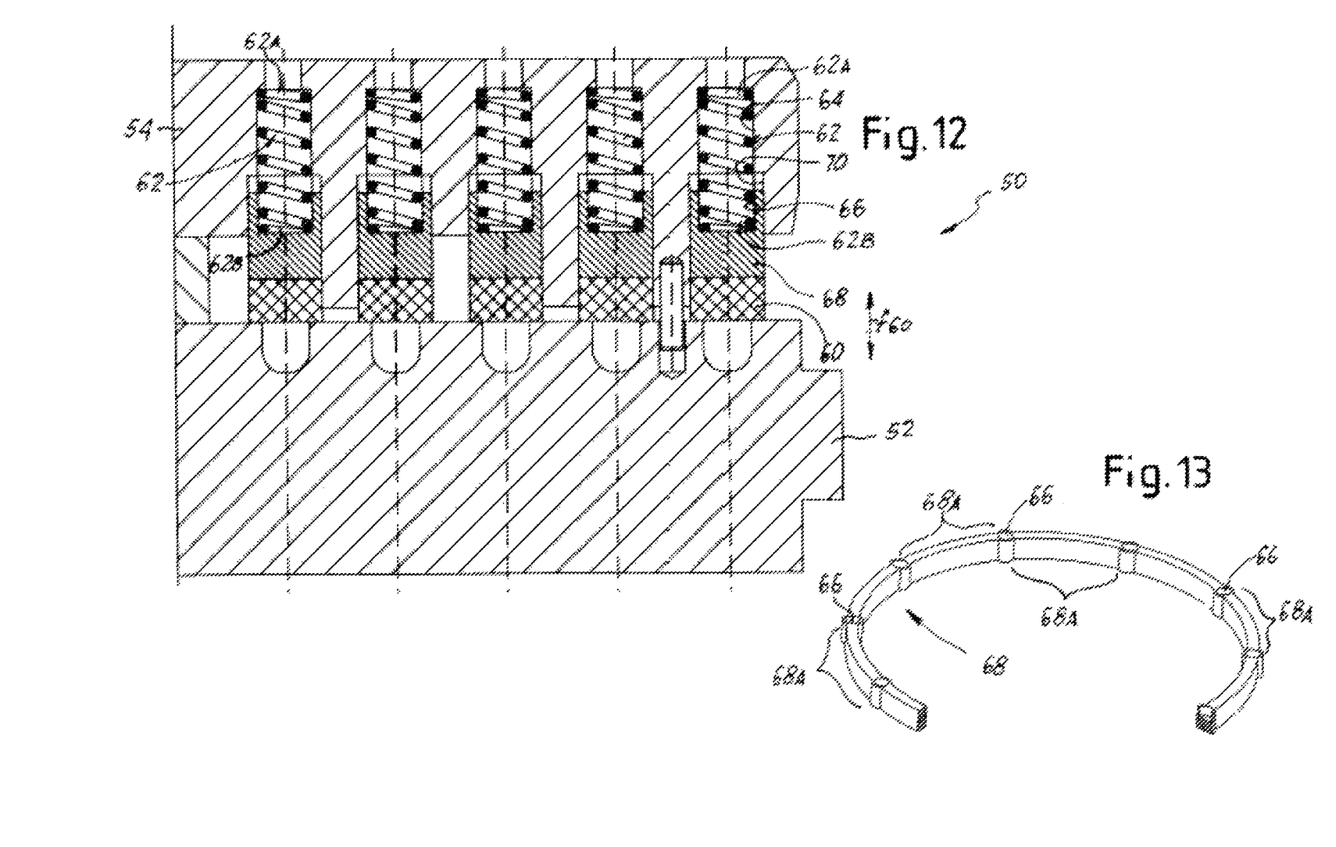
FIG. 12 illustrates an enlargement of FIG. 11.
FIG. 13 illustrates a perspective and sectional view of the spring holder ring of the valve of FIGS. 11 and 12.

FIGS. 11 to 13 illustrate a further embodiment of a ring valve according to the subject matter disclosed herein. The same reference numbers as in FIGS. 8 to 10 designate the same or equivalent elements of the valve, which will not be described in detail again.

The main difference between the ring valve of FIGS. 8 to 10 and the ring valve of FIGS. 11 to 13 is that in the ring valve of FIGS. 11 to 13, the spring holder rings 68 have a variable cross-section. Each spring holder ring 68 has a larger cross section in the area where the spring retention seats 66 are arranged, while the portion extending between each pair of consecutive retention seats 66, indicated with 68A in FIG. 13, has a narrower cross-section. This makes it possible to reduce the radial dimension of the spring retention rings 68 without having to reduce the diameter of the compression springs. Indeed, as can be appreciated by comparing the left-hand part of the cross-section of FIGS. 8 and 11, for example, it will be understood that in the embodiment of FIGS. 11, 12 and 13 the annular slot 70, wherein each spring holder ring 68 is guided during the opening and closing movement of the shutter ring 60, is a substantially continuous slot running around the entire annular development of the spring holder ring 68.

The embodiment of FIGS. 11, 12 and 13 may result in a better guiding effect of the spring holder rings 68 in the respective annular slots 70.

It shall be understood that spring holder rings 68 with a variable cross section as shown in FIGS. 11 to 13 can be used also in the embodiment of FIGS. 3 to 7, where a double set of compression springs 62, 74 in series are used for each shutter ring 60.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

What is claimed is:

1. An automatic valve comprising:
    a valve seat having first gas flow passages extending there through;
    a valve guard having second gas flow passages extending there through;
    at least one shutter member movably arranged between the valve guard and the valve seat;
    at least one set of spring members, biasing the at least one shutter member towards a closed position in sealing engagement with the valve seat to close the first gas flow passages;
    at least one spring holder ring comprising a plurality of spring retention seats, each spring member of the set of spring members is partially housed in a respective spring pocket formed in the valve guard and retained in a respective one of the spring retention seats.

2. The valve according to claim 1, wherein said at least one spring holder ring further comprises a surface facing the valve seat, contacting the at least one shutter member.

3. The valve according to claim 2, wherein secondary spring members are arranged between the at least one spring holder ring and the at least one shutter member.

4. The valve according to claim 1, wherein each of the at least one spring holder rings is slidingly engaged in a respective annular slot provided in the valve guard.

5. The valve according to claim 1, further comprising a plurality of the at least one spring holder rings and a plurality of the at least one set of spring members, the spring members of each set of the spring members being partially arranged in spring retention seats of a corresponding one of the plurality of spring holder rings.

6. The valve according to claim 1, wherein the at least one shutter member comprises a shutter plate.

7. The valve according to claim 5, further comprising a plurality of shutter members, each shutter member comprising a shutter ring, each shutter ring being combined with a corresponding one of the plurality of spring holder rings.

8. The valve according to claim 1, wherein the spring members are helical compression springs.

9. The valve according to claim 8, wherein each spring member has a first end and a second end, and the first end is housed in a corresponding one of the spring pockets and the second end is retained in a corresponding one of the spring retention seats of the respective spring holder ring.

10. The valve according to claim 1, wherein each spring holder ring comprises a plurality of secondary spring retention seats, and a secondary spring member is arranged in each of the secondary spring retention seats and resiliently contacts the at least one shutter member.

11. The valve according to claim 1, wherein each spring holder ring is made of a shock damping material.

12. The valve according to claim 1, wherein each spring holder ring is made of a composite material.

13. The valve according to claim 11, wherein each spring holder ring is made of a reinforced thermoplastic material.

14. The valve according to claim 13, wherein the thermoplastic material is reinforced with fibers selected from the group consisting of: glass fibers, carbon fibers, aramidic fibers, or combinations thereof.

15. An automatic valve comprising:
a valve seat having first gas flow passages extending there through;
a valve guard having second gas flow passages extending there through;
a plurality of shutter rings arranged between the valve guard and the valve seat;
for each shutter ring, a set of spring members, biasing the respective shutter ring towards a closed position in sealing engagement with the valve seat for closing the first gas flow passages;
for each shutter ring, a corresponding spring holder ring comprising a plurality of spring retention seats, each spring member of the respective set of spring members being partially arranged in a respective spring pocket formed in the valve guard and retained in a respective retention seat of the spring holder ring.

16. The valve according to claim 15, wherein each spring holder ring further comprises a plurality of secondary spring retention seats, and a secondary spring member is arranged in each secondary spring retention seat and resiliently contacts the corresponding shutter ring.

17. The valve according to claim 15, wherein spring holder rings are movable independently from one another.

18. A reciprocating compressor comprising at least one automatic valve having:
a valve seat having first gas flow passages extending there through;
a valve guard having second gas flow passages extending there through;
at least one shutter member movably arranged between the valve guard and the valve seat;
at least one set of spring members, biasing the at least one shutter member towards a closed position in sealing engagement with the valve seat to close the first gas flow passages;
at least one spring holder ring comprising a plurality of spring retention seats, each spring member of the set of spring members is partially housed in a respective spring pocket formed in the valve guard and retained in a respective one of the spring retention seats.

* * * * *